(12) United States Patent
Katsumata et al.

(10) Patent No.: US 7,789,364 B2
(45) Date of Patent: Sep. 7, 2010

(54) OPENING DEVICE FOR DISPLAY MONITOR OF PROJECTOR SYSTEM

(75) Inventors: Tsutomu Katsumata, Higashiosaka (JP); Yukihiro Nishida, Higashiosaka (JP)

(73) Assignee: Simotec Inc., Osaka-hu (JP)

( * ) Notice: Subject to any disclaimer, the term of this patent is extended or adjusted under 35 U.S.C. 154(b) by 623 days.

(21) Appl. No.: 11/724,000

(22) Filed: Mar. 23, 2007

(65) Prior Publication Data

US 2007/0252059 A1    Nov. 1, 2007

(30) Foreign Application Priority Data

Mar. 24, 2006    (JP) .............................. 2006-082219

(51) Int. Cl.
*E04G 3/00*    (2006.01)

(52) U.S. Cl. .............................. 248/292.13; 248/292.12

(58) Field of Classification Search ................ 248/27.3, 248/292.13, 292.12, 286.1, 285.1
See application file for complete search history.

(56) References Cited

U.S. PATENT DOCUMENTS

| | | | | |
|---|---|---|---|---|
| 4,643,382 | A * | 2/1987 | Ojima et al. ................. | 248/371 |
| 5,529,270 | A * | 6/1996 | Liu ............................ | 248/188 |
| 6,065,725 | A * | 5/2000 | Mason .................... | 248/292.11 |
| 6,116,557 | A * | 9/2000 | Choy et al. .............. | 248/286.1 |
| 6,296,217 | B1 * | 10/2001 | Ikedo et al. ............ | 248/292.12 |
| 2005/0205735 | A1 * | 9/2005 | Ichikawa et al. ........ | 248/292.12 |

* cited by examiner

*Primary Examiner*—Gwendolyn Baxter
(74) *Attorney, Agent, or Firm*—Bacon & Thomas, PLLC

(57) ABSTRACT

The display monitor of a rear projection system is pivotally connected to the projector body and provided with a resilient member that permits opening of the monitor in a vertical direction by the application of a small force during maintenance of the system.

4 Claims, 4 Drawing Sheets

OPENING DEVICE FOR DISPLAY MONITOR OF PROJECTOR SYSTEM

TECHNICAL FIELD

The present invention relates to an opening device for display monitor, particularly relates to an opening device for display monitor which is applicable to a projector system having a large display monitor such that the large display monitor can be lightly opened by a small manipulation force during maintenance of the projector system.

BACKGROUND ART

Conventionally, in order to facilitate maintenance of a rear projector system, the projector main body is provided with a display monitor of large size which can be opened in the vertical direction with a telescopic gas damper for opening and closing mechanism. In addition, the prior art techniques related to this include, for example, a telescopic gas damper provided for a liquid crystal display apparatus having a large liquid crystal panel in order to open and close the screen (for example, refer to Japanese Patent Published Application No. 2002-281416).

However, in the case of the above opening device for display monitor provided with a gas damper for opening a large size display monitor, when performing maintenance of a rear projector system, the large size display monitor is lifted in the upward direction by human power, such that there is a problem in that the operator has to bear a physically heavy burden.

The present invention is invented in order to solve the above problems. It is an object of the present invention to provide an opening device for display monitor of a projector system with a large display monitor which is connected to the projector main body such that it can be opened in the vertical direction, wherein the opening and closing mechanism is provided with a hinge mechanism having a resilient element such as a spring member such that the display monitor can be lightly opened by a small manipulation force.

SUMMARY OF THE INVENTION

In accordance with the present invention, an opening device for display monitor (3) operable to open a projector system which is provided with a projector main body (2) and a display monitor (3), comprises: an attachment member (4) attached to said projector main body (2); a first coupling pin (6) connected to said attachment member (4) and a pivotal member (5) which is fixed to said display monitor (3) in order that said pivotal member (5) can be pivoted about said first coupling pin (6) to open said display monitor (3) in the vertical direction; a second coupling pin (8) connected to said attachment member (4) and located in a position lower than said first coupling pin (6) and in parallel with said first coupling pin (6); a first resilient element support member (7) pivotally supported on said attachment member (4) through the second coupling pin (8); a third coupling pin (10) connected to said pivotal member (5) and located in a position lower than said second coupling pin (8) and in parallel with said second coupling pin (8); a second resilient element support member (9) pivotally supported on said pivotal member (5) through the third coupling pin (10); and a resilient member (11) installed between said first resilient element support member (7) and said second resilient element support member (9), wherein no rotational torque is exerted upon said display monitor (3) when a lower support point (16A) at which said resilient member (11) is supported by said second resilient element support member (9) and an upper support point (17A) at which said resilient member (11) is supported by said first resilient element support member (7) are positioned in order to align the action line (11A) connecting these support points with the line connecting the center of the first coupling pin (6) and the lower support point (16A), and wherein a rotational torque is exerted upon said display monitor (3) when said display monitor (3) is pivoted to an open position in order that said action line (11A) is moved to be remoter from said projector main body (2) than the center of said first coupling pin (6). The references in parenthesis are added only for the purpose of facilitating the understanding.

In accordance with such a configuration, when the display monitor (3) is in its closed position, the force of gravity of the display monitor (3) yields a rotational torque serving to maintain the closed position.

When the display monitor (3) is pivoted in the open direction such that the action line (11A) of the resilient member (11) is moved to a more front position than the center of the first coupling pin (6), a certain rotational torque is exerted upon the display monitor (3) in the open direction, and thereby the operator can open the display monitor (3) by only initially lifting a bit the display monitor (3) to open the display monitor (3), and the manipulation as required can be decreased. Even when the display Monitor (3) is fully opened, the rotational torque is exerted upon the display monitor (3) in the open direction so that the display monitor (3) shall not fall down from the fully opened position by accident to maintain the fully opened position.

In accordance with one aspect of the present invention, the opening device for display monitor as described above is provided with a spring member as the resilient member (11). In accordance with another aspect of the present invention, the opening device for display monitor as described above is provided with a compression coil spring as said spring member.

In accordance with a further aspect of the present invention, the opening device for display monitor as described above is provided with a male type resilient element retaining case (12) and a female type resilient element retaining case (13), respectively as said first resilient element support member (7) and said second resilient element support member (9), which are coupled by inserting one into the other. By this configuration, the resilient member (11) can be stably and securely operated within the male and female type resilient element retaining case (12) and (13).

In accordance with the present invention, the display monitor which is closed can be fully opened without effort only by the manipulation of only initially lifting a bit the display monitor, and it is possible to improve the workability of maintenance of the projector system.

BEST MODE FOR CARRYING OUT THE INVENTION

Figure 1:
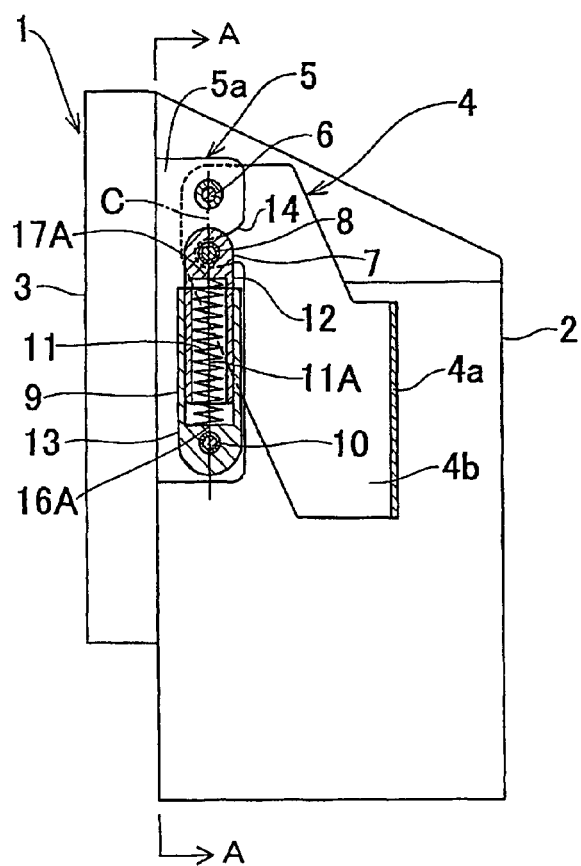
FIG. 1 is a side view in vertical cross section for showing an opening device for display monitor in accordance with an embodiment of the present invention.
Figure 2:
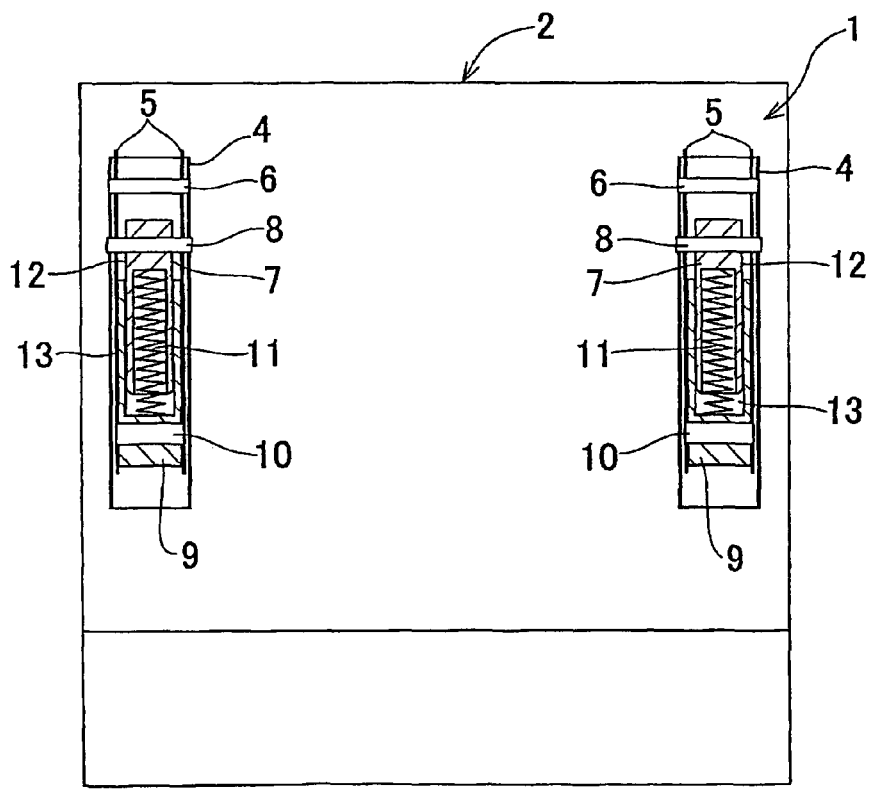
FIG. 2 is a front view in vertical cross section along line A-A of FIG. 1.
Figure 3:
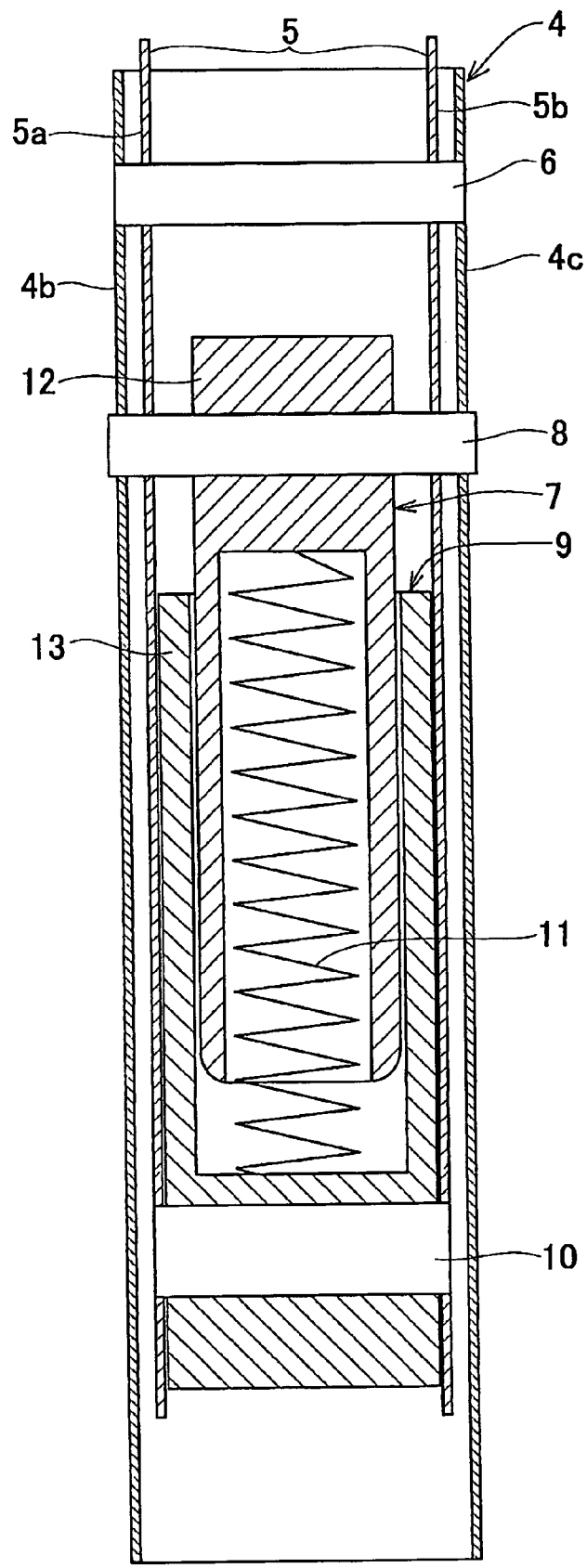
FIG. 3 is an enlarged view of part B of FIG. 2.
Figure 4:
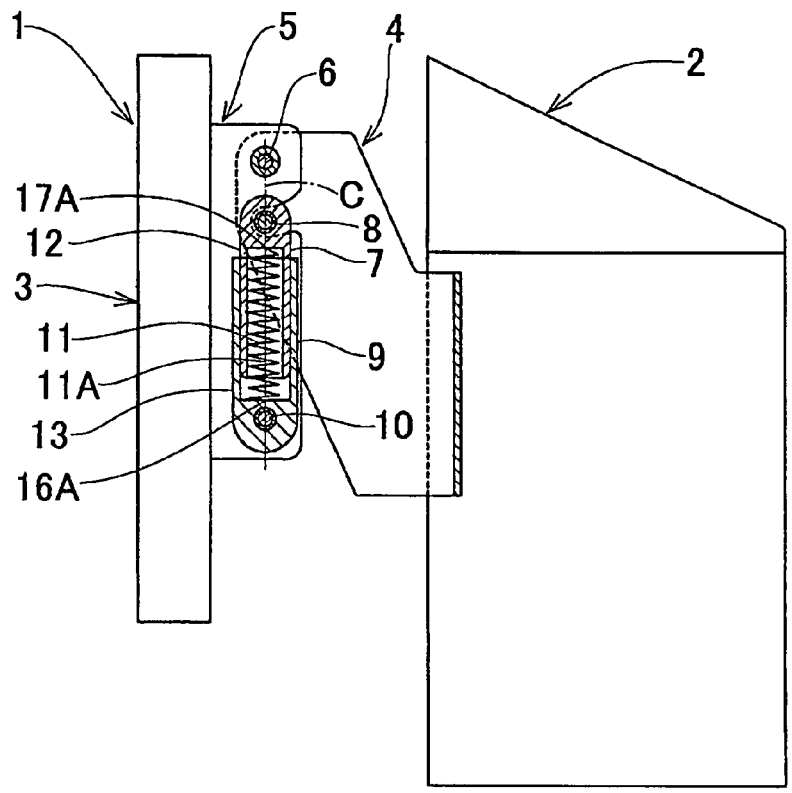
FIG. 4 is a side view in vertical cross section for showing the opening device for display monitor of FIG. 1 in which the display monitor is forward slid.
Figure 5:
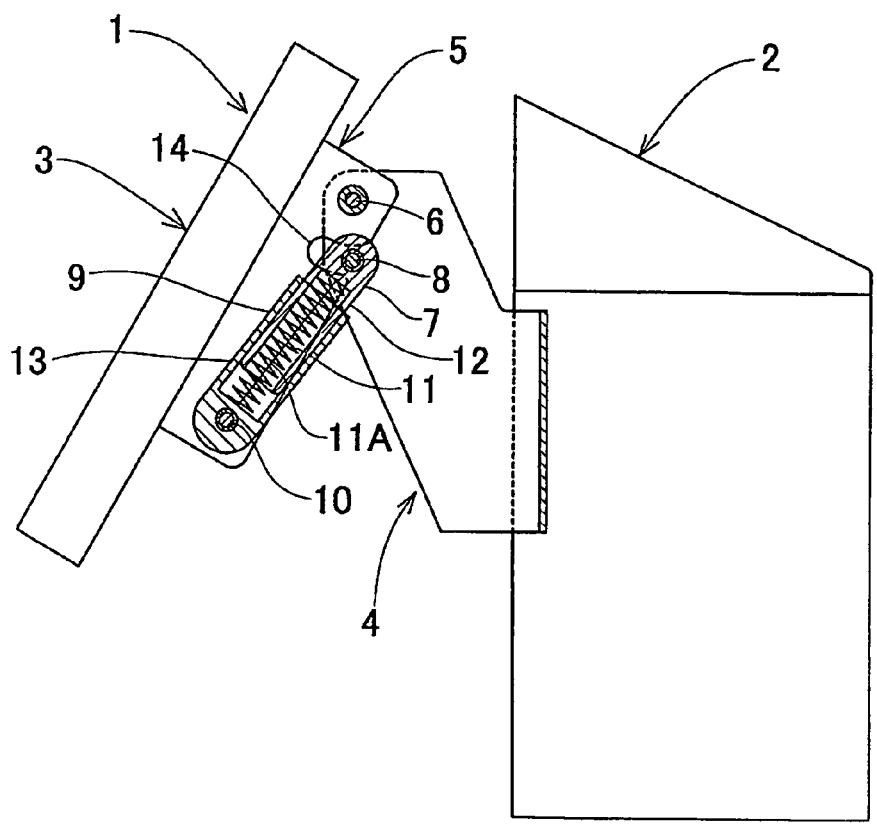
FIG. 5 is a side view in vertical cross section for showing the opening device for display monitor of FIG. 1 in the middle of the process of opening or closing the display monitor.
Figure 6:
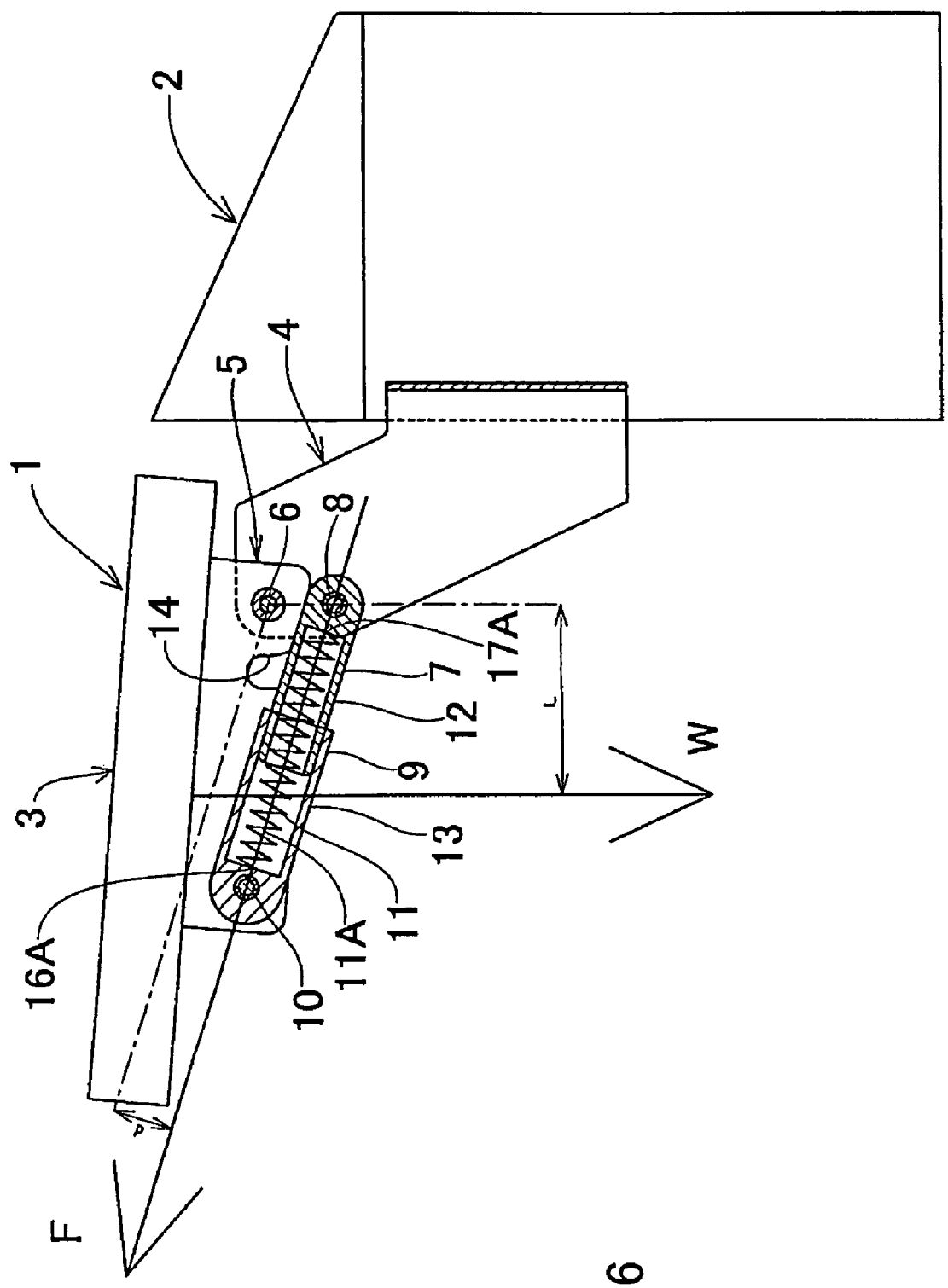
FIG. 6 is a side view in vertical cross section for showing the opening device for display monitor of FIG. 1 in which the display monitor is fully opened.

A preferred embodiment of the present invention will be explained with reference to the drawings. FIG. 1 is a side view in vertical cross section for showing an opening device for display monitor in accordance with an embodiment of the present invention; FIG. 2 is a front view in vertical cross section along line A-A of FIG. 1; FIG. 3 is an enlarged view of part B of FIG. 2; FIG. 4 is a side view in vertical cross section for showing the opening device for display monitor of FIG. 1 in which the display monitor is forward slid; FIG. 5 is a side view in vertical cross section for showing the opening or closing device for display monitor of FIG. 1 in the middle of the process of opening the display monitor; and FIG. 6 is a side view in vertical cross section for showing the opening device for display monitor of FIG. 1 in which the display monitor is fully opened.

In FIG. 1 and FIG. 2, the opening device for display monitor 1 of a projector system in accordance with the present invention is provided with a projector main body 2, a large size display monitor 3 which is provided along the front face of this projector main body 2 such that it can be opened and closed in the vertical direction.

The projector main body 2 is provided with a pair of attachment members 4 each of which is attached such that it can be forward and backward shifted between a retracted position (refer to FIG. 1) in which the attachment member 4 is located in the projector main body 2 and a forward position (refer to FIG. 4) in which the attachment member 4 is moved forward in front of the projector main body 2. As shown in FIG. 1 and FIG. 3, each of the attachment members 4 is formed to have a vertical groove in cross section view and provided with a longitudinal web plate 4a and right and left side plates 4b and 4c which are attached to this longitudinal web plate 4a in order to protrude from both right and left edges of the web plate 4a. In the example as illustrated, there are the right and left attachment members 4 in a pair. However, only one attachment member 4 may be used in some cases.

On the other hand, the back face of the display monitor 3 is provided with pivotal members 5 which are attached corresponding to the attachment members 4 respectively. Each of the pivotal members 5 is pivotally supported about a first coupling pin 6 with respect to the attachment member 4 such that the display monitor 3 can be opened and closed in the vertical direction. In other words, each of the pivotal members 5 is provided with right and left side plates 5a and 5b fitted between the left and left side plates 4b and 4c of the corresponding attachment member 4, and the upper portions of these right and left side plates 5a and 5b are pivotally supported about the first coupling pin 6 with respect to the attachment member 4 such that these can be opened and closed.

As shown in FIG. 1 through FIG. 3, each of the attachment members 4 is provided with a first resilient element support member 7 pivotally supported about a second coupling pin 8, which is provided in parallel with the first coupling pin 6 and located in a position lower than this pin 6, and the pivotal member 5 is provided with a second resilient element support member 9 which is pivotally supported about a third coupling pin 10, which is provided in parallel with the second coupling pin 8 and located in a position lower than this pin 8. A resilient element 11 made of a compression coil spring is installed between the first resilient element support member 7 and the second resilient element support member 9. When installed, the resilient element 11 is compressed in order to urge the first resilient element support member 7 and the second resilient element support member 9 to depart from each other by its spring return force.

The first resilient element support member 7 and the second resilient element support member 9 are inserted coupled such that they can telescopically slide with respect to each other, and formed of a male type resilient element retaining case 12 in the form of a cylinder which is downwardly opened and a female type resilient element retaining case 13 in the form of a cylinder which is upwardly opened in order to keep the resilient element 11 therebetween and therein. In the illustrated example, the female type resilient element retaining case 13 is axially connected to the pivotal member 5 by means of the third coupling pin 10 at their lower positions, and the male type resilient element retaining case 12 is axially connected to the attachment member 4 at their upper position by means of the second coupling pin 8 located below the first coupling pin 6. The right and left side plates 5a and 5b of the pivotal member 5 are provided with cutting sections 14 which are formed for the purpose of preventing interference with the second coupling pin 8.

No rotational torque is exerted upon the display monitor 3 when the display monitor 3 is in its closed position as illustrated in FIG. 1 and FIG. 4 in which a lower support point 16A at which the resilient member 11 is supported by the second resilient element support member 9 and an upper support point 17A at which the resilient member 11 is supported by the first resilient element support member 7 are positioned in order to align the action line 11A connecting these support points 16A and 17A with the line C connecting the center of the first coupling pin 6 (the center of rotation of the display monitor 3) and the lower support point 16A. However, when the display monitor 3 is pivoted in the open direction as illustrated in FIG. 5 and FIG. 6, i.e., when the action line 11A is moved to a more front position than the center of the first coupling pin 6, a certain rotational torque is exerted upon the display monitor 3 in the open direction. As illustrated in FIG. 6, the spring force F of the resilient member 11 yields a rotational torque of (F·d), where "d" is the distance between the center of the first coupling pin 6 and the center line of the resilient member 11. The display monitor 3 does not fall down from its open position if F·d≧W·L, where "W" is the force of gravity exerted upon the display monitor 3, and "L" is the distance between the vertical line passing through the center of gravity of the display monitor 3 and the center of the first coupling pin 6.

Next, the opening action of the opening device for display monitor 1 having the structure as described above will be explained with reference to FIG. 1 and FIG. 4 through FIG. 6.

FIG. 1 shows the home position of the display monitor while FIG. 4 shows an advanced position in which the display monitor 3 is forward slid from the projector main body 2 together with the attachment member 4. In this case, the display monitor 3 is in its closed position in which the action line 11A of the resilient member 11 is aligned with the line C connecting the center of the first coupling pin 6 and the lower support point 16A so that no rotational torque is exerted upon the display monitor 3. Accordingly, the display monitor 3 maintains its closed position due to the force of gravity exerted upon the display monitor 3 which yields the rotational torque in the closing direction of the display monitor 3

When the maintenance of the projector system is performed, the operator can open the display monitor 3 by only initially lifting a bit the display monitor 3 and pivoting it about the first coupling pin 6 in the opening direction. Then, as shown in FIG. 5 and FIG. 6, the action line 11A of the resilient member 11 is moved in a more front position than the center of the first coupling pin 6 (i.e., in the open position side of the display monitor 3) in order to yield a rotational torque exerted upon the display monitor 3 in the opening direction, and thereby even if the operator releases his hand from the display monitor 3, the display monitor 3 is automatically opened into its fully opened position. Even when the display monitor 3 is fully opened, the rotational torque is exerted upon the display monitor 3 in the open direction so that the display monitor 3 shall not fall down from the fully opened position by accident to secure a safe environment.

Although the compression coil spring is used as an illustrative example of the resilient member 11 in the above embodiment, any other appropriate spring member can be used in place of the compression coil spring.

In addition, although the second coupling pin 8 is positioned on the line C connecting the center of the first coupling pin 6 and the lower support point 16A when the display monitor 3 is closed as illustrated in FIG. 1 in the above embodiment, the configuration can be designed in order that, when the display monitor 3 is closed, the second coupling pin 8 is located in a position a little forward of the above connecting line C, i.e., in a position closer to the display monitor 3 than the connecting line C.

While the present invention has been described in terms of embodiments, it is apparent to those skilled in the art that the invention is not limited to the embodiments described. The present invention can be practiced with modification and alteration within the spirit and scope of the appended claims. The description is thus to be regarded as illustrative instead of limiting in any way on the present invention.

The invention claimed is:

1. An opening device for a display monitor operable to open a projector system which is provided with a projector main body and a display monitor, comprising:
   an attachment member attached to said projector main body;
   a first coupling pin connected to said attachment member and a pivotal member which is fixed to said display monitor in order that said pivotal member can be pivoted about said first coupling pin to open said display monitor in a vertical direction;
   a second coupling pin connected to said attachment member and located in a position lower than said first coupling pin and in parallel with said first coupling pin;
   a first resilient element support member pivotally supported on said attachment member through the second coupling pin;
   a third coupling pin connected to said pivotal member and located in a position lower than said second coupling pin and in parallel with said second coupling pin;
   a second resilient element support member pivotally supported on said pivotal member through the third coupling pin; and
   a resilient member installed between said first resilient element support member and said second resilient element support member,
   wherein no rotational torque is exerted upon said display monitor when a lower support point at which said resilient member is supported by said second resilient element support member and an upper support point at which said resilient member is supported by said first resilient element support member are positioned in order to align an action line connecting the lower support point and the upper support point with a line connecting the center of the first coupling pin and the lower support point, and
   wherein a rotational torque is exerted upon said display monitor when said display monitor is pivoted to an open position in order that said action line is moved to be more remote from said projector main body than the center of said first coupling pin.

2. The opening device for display monitor as claimed in claim 1 wherein said resilient member is a spring member.

3. The opening device for display monitor as claimed in claim 1 wherein said resilient member is a compression coil spring.

4. The opening device for display monitor as claimed in claim 2 wherein a male resilient element retaining case and a female resilient element retaining case are provided respectively as said first resilient element support member and said second resilient element support member, which are coupled by inserting one into the other.

* * * * *